United States Patent [19]

Yoshida

[11] 4,211,824

[45] Jul. 8, 1980

[54] BONDING RUBBER TO METAL

[75] Inventor: Shinichi Yoshida, Hamamatsu, Japan

[73] Assignee: Honny Chemicals Company, Ltd., Kobe, Japan

[21] Appl. No.: 888,732

[22] Filed: Mar. 21, 1978

Related U.S. Application Data

[62] Division of Ser. No. 717,928, Aug. 26, 1976, Pat. No. 4,096,009.

[30] Foreign Application Priority Data

Aug. 29, 1975 [JP] Japan .................. 50-104686

[51] Int. Cl.² .............. B32B 15/06; B32B 15/08; B32B 25/08; C25D 3/38
[52] U.S. Cl. .................... 428/462; 156/110 A; 156/124; 156/151; 156/331; 204/35 R; 204/38 R; 427/405; 427/436; 427/409; 427/437; 428/463; 428/469; 428/515; 428/519; 428/520; 428/625
[58] Field of Search ............ 156/110 A, 124, 150, 156/151, 331, 334; 204/35 R, 38 R; 427/405, 409, 436, 437; 428/462, 463, 469, 515, 519, 520, 625; 526/265

[56] References Cited

U.S. PATENT DOCUMENTS

| 215,034 | 5/1879 | Adams | 427/405 X |
|---|---|---|---|
| 1,036,576 | 8/1912 | Daft | 156/151 |
| 1,883,973 | 10/1932 | Kurtz | 428/470 |
| 1,906,436 | 5/1933 | Thompson . | |
| 1,919,718 | 7/1933 | Gray | 156/308 |
| 2,563,113 | 8/1951 | Hindin et al. | 156/151 X |
| 2,978,377 | 4/1961 | Hall et al. | 428/519 X |
| 3,708,329 | 1/1973 | Schoenberg | 427/437 X |
| 3,728,192 | 4/1973 | Kindle et al. | 156/306 |
| 3,849,172 | 11/1974 | Chin et al. | 204/30 X |
| 3,857,726 | 12/1974 | Van Gils | 156/315 X |
| 3,878,134 | 4/1975 | Ozelli et al. | 156/333 X |
| 3,961,740 | 6/1976 | Nakamoto et al. | 427/405 |
| 3,978,803 | 9/1976 | Asano et al. | 427/405 X |
| 3,993,847 | 11/1976 | Kondo | 428/451 |
| 3,998,992 | 12/1976 | Nakamura | 428/451 |
| 4,049,875 | 9/1977 | Edie | 428/462 |

FOREIGN PATENT DOCUMENTS 929211 of 0000 United Kingdom .
474162 of 1975 U.S.S.R. .

*Primary Examiner*—John T. Goolkasian
*Assistant Examiner*—Robert A. Dawson
*Attorney, Agent, or Firm*—Stevens, Davis, Miller & Mosher

[57] ABSTRACT

The bond strength of composite articles of rubber adhered to ferrous metal substrates through an adhesive is substantially improved at ambient and elevated temperatures by depositing a specified amount of a layer of copper on said ferrous metal substrate, applying an adhesive thereover comprising an interpolymer containing about 50 to about 99% by weight of a conjugated diene, about 1-45% by weight of a heterocyclic base and 0 to about 40% by weight of at least one additional copolymerizable monomer, thereafter contacting said adhesive with the rubber to be bonded and bonding by heat and pressure.

12 Claims, No Drawings

BONDING RUBBER TO METAL

This is a division of application Ser. No. 717,928 filed Aug. 26, 1976 and now U.S. Pat. No. 4,096,009.

This invention relates to a process for the bonding of rubber to ferrous metal substrates and to novel composite structures obtained by that process.

More particularly the present invention relates to the bonding of rubber to ferrous metal substrates by depositing a copper layer on said substrate followed by bonding through an adhesive comprising an interpolymer of a conjugated diene and a heterocyclic nitrogen base.

The vulcanization or the adhesion of rubber to metals has heretofore been accomplished by various processes. These include brass, bronze and zinc plating; the use of halogenated natural or synthetic rubbers with and without special adhesion promoting additives such as di-C-nitroso compounds or cobalt naphthanate, etc; isocyanates or isocyanate rubber blends; and synthetic resins of the phenol formaldehyde type. Each suffers from certain obvious weaknesses.

Clorinated and brominated natural and synthetic rubbers, particularly when formulated to include crosslinking and adhesion promoting additives such as di-C-nitrosated aromatics give good adhesive bonds between various metals and natural and synthetic rubbers. Because of their somewhat polar nature, they are able to adhere to metals without covalent bonding with the metal surface. This lack of a chemical bond to the metal surface is obviously a disadvantage for the adhesive strength of such systems falls rapidly with increasing temperature.

Polyfunctional isocyanates such as P, P', P'' triisocyanate triphenyl methane by themselves and as additives to rubber solutions have been known for many years to provide good bond strength between rubber and metals. While the mechanism of adhesion is not clearly understood, it is postulated that the isocyanates can chemically react with both the rubber and the metal surface. In the former case, active hydrogens, e.g., hydroxy or carboxyl groups generated by oxidation during rubber processing provide a reaction site for the formation of urethane and other linkages. In the bonding to the metal surface it has been suggested that oxide surfaces which frequently contain some hydroxy groups could react with the isocyanate group. In any event the solvent resistance and rate of reduction of bond strength with increasing temperature of isocyanate bonded rubber to metal parts is better than would be expected if the adhesion to metal were due only to physical forces. The disadvantages of isocyanate based systems include high moisture sensitivity and very short pot life due to the highly reactive isocyanate groups and the poor thermal aging characteristics of this bond.

Synthetic resins of the phenol-formaldehyde type, usually blended with a rubbery polymer latex also can be used to bond rubber to metal. This sort of adhesive can chemically combine with an unsaturated rubber either by a migration of sulfur and accelerators from the rubber into the adhesive layer followed by a covulcanization or possibly by reaction of the methylol groups of the resole with the rubber itself. However the adhesion to the metal surface is physical in nature, i.e. Van der Waal type forces and the bond strengths to metal are generally poor, especially at elevated temperatures.

The use of a thin coating of copper by electroless deposition on a metal surface to improve the bond between the metal and vulcanizable rubber was first patented in 1879 (U.S. Pat. No. 215,034). Presumably, during the sulfur vulcanization of the unsaturated rubber in contact with the copper plated metal surface, both the copper and the unsaturated rubber compete simultaneously for the sulfur. Since the sulfur has a valence of two, it is postulated that for a portion of the sulfur at the interface one valence is satisfied by reacting with the copper while the other bonds to the rubber. In such a way a covalent linkage is formed between the metal surface and the rubber thus bonding one to the other. The bond formed is rather weak. Numerous patented improvements followed this disclosure such as depositing the copper electrolytically instead of by the original electroless deposition (British Pat. No. 929,211), depositing the copper from organic solvents, (U.S. Pat. Nos. 1,883,973 and 1,906,436), depositing the copper in the presence of surfactants etc. These modifications were aimed at improving the uniformity and adhesion of the copper to the metal surface and obtaining a reasonable rate of deposition. Since these bonds were still weak, the copper plated metal was often coated with a tie-coat to improve the wetting of the metal surface prior to bonding to a vulcanizable rubber. These tie coats typically consisted of natural rubber plus curatives dissolved in a suitable solvent. Unfortunately none of these approaches corrects the weaknesses that prevent pure copper coatings from being commercially practical for bonding rubber to metal. There are two main reasons for the failure of pure copper as an adhesive. First, it appears that the shear strength of the copper sulfide formed is comparatively weak, or perhaps the shear weakness is at the interface of the copper sulfide-unreacted copper. In any event, the bonds were too weak for commercial applications. And secondly, copper reacts very rapidly with the sulfur available at the metal-rubber interface. This can be so fast that there is no sulfur left in the immediate vicinity of the surface for bonding to and vulcanization of the unsaturated rubber. This results in no bond being formed between the metal and the rubber.

The use of brass plating and in some applications bronze or zinc plating overcomes the bond strength deficiency of pure copper "adhesive", however these processes, while commercially practical, still suffer from certain serious limitations. Any variations in the composition, crystal structure or thickness of the alloy coating can result in very poor adhesion to rubber. The plating processes are slow, often requiring as much as a minute to develop a satisfactory coating. The plating baths, especially for brass, use cyanides which are hazardous and result in a serious waste disposal problem.

While satisfactory adhesion can be achieved between rubber and brass, bronze or zinc plated metals, the requirement of good adhesion severely limits the rubber formulator for only certain formulations result in satisfactory adhesion. It is common practice, for example to use metal naphthenates or resorcinol-hexamethyleneimine combinations in the rubber to be bonded in order to improve the bond strength to brass. These approaches both add to the cost and adversely affect the physical properties of the rubber to be bonded.

In U.S. Pat. No. 2,978,377 it is mentioned that copolymers of butadiene and a vinyl pyridine such as 2-methyl-5-vinyl pyridine have been used for bonding rubber to metal and that when used with natural rubber or a GRS (1,3 butadiene-styrene) composition an excellent bond is obtained. No mention is made of the strength of such bonds at elevated temperatures and no data are given. In any event, it has been found that there are many natural rubber and GRS compositions that if bonded to metals with copolymers of vinyl pyridines and butadiene result in very poor bond strengths even at normal ambient temperature.

In U.S. patent application Ser. No. 610,695 filed Sept. 5, 1975 in the name of Dennis L. Edie and now U.S. Pat. No. 4,049,875, there is disclosed a process of bonding rubber to a ferrous metal substrate which offers substantial advantages over prior art. That process, like the present process, produces unexpectedly high bond strength especially at elevated temperatures by depositing a copper layer on a ferrous metal substrate, thereafter applying an adhesive comprising an interpolymer containing about 50 to about 99% by weight of a conjugated diene, about 1-45% by weight of a heterocyclic base and 0 to about 40% by weight of at least one additional copolymerizable monomer, thereafter contacting said adhesive with the rubber to be bonded and bonding by heat and pressure. Said copending application describes the process as requiring the deposit of a loosely adherent layer of copper on the ferrous metal substrate and points out that the loosely adherent layer is one which can be wiped off with a paper or cloth towel. The method of producing the loosely adherent copper coating is disclosed as electroless deposition from a solution of a cupric salt solution containing halide ions. It is further stated that other salts of organic and inorganic acids have been found to deposit a smooth, tightly adhered, coating which does not produce the improved bond strength. Furthermore, it is stated cuprous halide salts are not effective.

Further investigation by applicant has led to the discovery that high bond strength between rubber and the metal substrate as good as those achieved in said copending application can be obtained by depositing a copper layer on the metal substrate from solutions of copper salts other than cupric salt solutions containing halide ions. Contrary to the statements in the copending application, it has been found that cuprous salts can be utilized and that in fact any copper salt can be employed as long as the amount of copper deposited per area of the ferrous substrate is properly regulated. It has been found that the synergistic effect between the copper deposit and the interpolymer adhesive layer described in the copending application and hereinafter defined is unexpected and can not be explained in terms of known bonding mechanisms. When bond strengths of the composites are plotted versus the amount of copper deposited, a maximum range is observed which differs for each salt in a manner that is not predictable or understood. Often, but not always, the copper deposit may be loosely adherent. Furthermore, electrodeposition from cupric halide solutions may be utilized. Regardless of whether it is loosely adherent as in the case of electroless deposition from cupric halide solution, or tightly adherent as in the case of copper sulfate, a strong adhesive bond may be formed.

The test of bond strength described in the copending Edie application is the H-test. This is conducted by vulcanizing a wire under a pressure of 60 kg/cm$^2$ into the center of two blocks of rubber each having a width and length of 2 cm and a thickness of 1 cm. The two blocks are separated by a distance of 2.5 cm; the wire is embedded 2 cm into each block, the total wire length being 6.5 cm. The blocks are pulled apart at 200 mm per minute lineally with the wire axis until the wire is extracted from one of the blocks. The test is conducted at 120° C.

It has been determined that there is a minimum bond strength required to make a useful product which will satisfy the requirements of commercial use in such products as steel reinforced tires, belts and hoses over a wide temperature range. That minimum value measured by the above described H-test is 20 kg/2 cm at 120° C.

The present process produces minimum adhesion or bond strength which easily satisfies those requirements and in fact produces bond strength or adhesion according to the described H-test of 40 to 80 kg/2 cm or higher depending on the rubber and curing conditions.

As previously indicated, in order to achieve such excellent bond strength raning from 40 kg/2 cm to 80 kg/2 cm or higher at 120° C. it is necessary to utilize the interpolymer adhesive hereinafter defined and to deposit on the ferrous substrate a given amount of copper per area of substrate which amount will vary with the specific copper salt from which the copper is deposited on the substrate, and may also differ depending upon the method of deposition, i.e. electrodeposition or electroless deposition. Accordingly, the amount of copper necessary to be deposited to accomplish the ends of the present invention is that amount which will produce adhesion of 40 kg/2 cm to 80 kg/2 cm or higher at 120° C. depending on the rubber and curing conditions. This is a value easily determined by emperical testing.

The solutions of copper salts that can be used in the present invention are aqueous or non-aqueous acid or alkaline solutions of cupric salts such as copper sulfate (II), copper nitrate (II), copper formate (II), copper phosphate (II), copper citrate (II), copper cyanide (II), copper arsenate (II), copper carbonate (II), copper chromate (II), copper chlorate (II), copper borofluoride (II), copper hydroxide (II), copper iodate (II), copper oxalate (II), copper salicylate (II), or copper pyrophosphate (II), or queous or non-aqueous acid or alkaline solutions of cuprous salts such as copper bromide (I), copper chloride (I), copper cyanide (I), or copper fluoride (I). The deposit of copper from these salt solutions may be by electrodeposition or electroless deposition. The coating of copper on the ferrous substrate may be a loosely adherent coating or a tightly adhered coating. For all salts the general range of copper to be deposited in order to exceed the referred to minimum adhesion varies from about 0.1 to about 9.5 g/m$^2$. The specific amount of copper to be deposited can vary within the above general range according to the particular salt as exemplified by the following list:

| | | |
|---|---|---|
| Copper sulfate (II) | 0.2 to 1.1 | electroless |
| Copper sulfate (II) | 0.09 to 4.4 | electrodeposition |
| Copper nitrate (II) | 0.5 to 9.5 | electroless |
| Copper formate (II) | 0.5 to 1.3 | electroless |
| Copper phosphate (II) | 0.9 to 3.7 | electroless |
| Copper cyanide (II) | 0.3 to 1.9 | electrodeposition |
| Copper carbonate (II) | 0.1 to 1.5 | electrodeposition |
| Copper perchlorate (II) | 0.02 to 1.5 | electroless |
| Copper hydroxide (II) | 0.3 to 3.7 | electrodeposition |
| Copper iodide (I) | 0.3 to 6.4 | electrodeposition |
| Copper oxalate (II) | 0.09 to 8.2 | electrodeposition |
| Copper acetate (II) | 0.09 to 3.7 | electrodeposition |
| Copper pyrophosphate (II) | 0.1 to 1.6 | electrodeposition |
| Copper bromide (I) | 0.1 to 3.5 | electroless |
| Copp;er chloride (I) | 0.09 to 1.7 | electroless |
| Copper cyanide (I) | 0.1 to 1.1 | electrodeposition |

Those skilled in the art will of course realize that many methods are known for plating copper onto a metal surface. For example, electroless plating can be accomplished from aqueous or organic solutions of copper salts. Any of these methods can be used in the practice of this invention so long as the coatings of copper are deposited in the amount discussed above. The treating time that generates the aforementioned copper coating, is preferably 1 to 60 seconds, but can be as low as 0.5 seconds or less depending on the type of anion that exists in the solution of copper salt as well as concentration, temperature and degree of agitation of the solution.

As indicated above, the electroless deposition may be accomplished by dipping the ferrous article in the copper salt solution for a period of time from one second to about 60 seconds. Other conditions of this dipping step, i.e. concentration of copper salt, temperature of the solution and degree of agitation of the solution may be widely varied by the operator, with the best results for any particular system being easily determined. Generally a concentration of about 1 to 10 percent may be utilized at temperatures from 15° C. to 40° C., with or without agitation. Times of more than sixty seconds may be used, but are unnecessary.

Alternatively, electrodeposition may be utilized in the present invention to deposit copper in the above mentioned amounts of 0.1 to 9.5 g/m² of surface. Many bath compositions for the electrodeposition of copper are well known and can be rendered suitable readily by those skilled in the art. Bath compositions suitable for this invention include copper pyrophosphate (II)-potassium pyrophosphate solution, copper cyanide (I)-sodium cyanide solution, copper sulfate (II)-sulfuric acid solution, copper borofluoride (II)-solution etc.

Conditions for the electrodeposition of copper can be widely varied by those skilled in the art with the best results for any particular system being easily determined. For example, in the copper pyrophosphate (II)-potassium pyrophosphate case, the treating time is preferably 10 to approximately 60 seconds. The electrodeposition of copper is conducted using a bath composition of adjusted ph value of 9 by adding nitric acid, the current density is 1 A/dm² at 20° under stirring.

The rubbery interpolymers used as the adhesive in the present invention may be copolymers of a conjugated diene with a heterocyclic nitrogen base or interpolymers of the above with at least one additional copolymerizable monomer. Those polymers applicable in the present invention are comprised of about 40–99% by weight of the conjugated diene, about 1–45% by weight of a heterocyclic nitrogen base with 5–15% being preferred and 0 to about 40% by weight of at least one additional copolymerizable monomer. With copolymers the amount of heterocyclic nitrogen base is desirably maintained at 1–25% by weight.

Within these limits the compositions of the copolymers can be varied widely without sacrificing the excellent hot bond strengths achieved with this invention. Commercially, due to the expense of, e.g. vinyl pyridines, copolymers with relatively low levels of copolymerizable heterocyclic nitrogen base are preferred and amounts as low as 1% have been found to be effective.

These copolymers can be prepared by any method known in the art such as thermal, solution, suspension, mass, and emulsion polymerization. The copolymerization can be free radical or anionic, random, block or stereospecific. The preferred method is by emulsion polymerization.

The conjugated dienes useful in this invention are preferably those which contain four to six, inclusive, carbon atoms per molecule but those containing more carbon atoms per molecule, e.g., eight can also be used. These compounds include hydrocarbons such as 1,3 butadiene, isoprene, piperylene, methyl pentadiene, 2,3 dimethyl-1,3-butadiene, 2,3-diethyl-1,3-butadiene, halohydrocarbons such as haloprenes, e.g. chloroprene, methyl chloroprene and others; and alkoxy hydrocarbons such as methoxy and ethoxy derivatives of the above conjugated dienes e.g. 2 methoxybutadiene and 3-ethoxy-1,3-butadiene.

The polymerizable heterocyclic nitrogen bases which are applicable in this invention are those of the pyridine, quinoline, and isoquinoline series which are copolymerizable with a conjugated diene and contain one and only one CH₂=C< substituent and preferably the group is

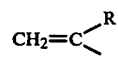

where R is either a hydrogen or a methyl group. That is, the substituent is either a vinyl or an alphamethylvinyl (isopropenyl) group. Of these compounds, the pyridine derivatives are preferred. Various substituted derivatives are also applicable but the total number of carbon atoms in the nuclear substituted groups, such as alkyl groups, should not be greater than 15 because the polymerization rate decreases somewhat with increasing size of the alkyl group. Compounds where the alkyl substituents are methyl and/or ethyl are available commercially and are preferred in this invention.

These heterocyclic nitrogen bases have the formula

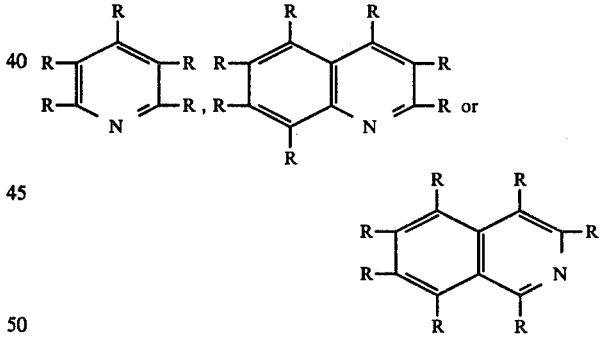

where R is selected from the group consisting of hydrogen, alkyl vinyl, alpha-methylvinyl, alkoxy, halo, hydroxy, cyano, aryloxy, aryl and combinations of these groups such as halo-alkyl, alkylaryl, hydroxyaryl, and the like, one and only one of said groups being of the type CH₂=C< and preferably being a vinyl or alpha-methyl vinyl group; and the total number of carbon atoms in the nuclear substituted groups being not greater than 15. As has been indicated, the preferred compounds are those wherein the R groups, other than the vinyl or alphamethylvinyl group, are hydrogen or alkyl of 1 to 4 carbon atoms. Examples of such compounds are 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

Interpolymers can be prepared from a mixture of two of the previously mentioned conjugated dienes and a hetrocyclic nitrogen base or from a conjugated diene and two different hetro cyclic nitrogen bases. It is, however, more common to prepare interpolymers from a single conjugated diene, a single hetrocyclic nitrogen base and at least one other polymerizable monomer. The latter monomers comprise organic compounds containing at least one polymerizable ethylenic group of the type $>C=C<$. These compound are well known in the art and include, for example, the alkenes, alkadienes, and the styrenes such as ethylene, propylene, 1-butylene, 2-butylene, isobutylene, 1-octene, 1,4-pentadiene, 1,6-hexadiene, 1,7-octadiene, vinyltoluene, vinylxylene, ethylvinylbenzene, vinylcumene, 1,5-cyclooctadiene, cyclohexene, cyclooctene, benzylstyrene, chlorostyrene, bromostyrene, fluorostyrene, trifluoromethylstyrene, iodostyrene, cyanostyrene, nitrostyrene, N,N-dimethylaminostyrene, 3-phenyl-3-butene-1-ol, p-methoxystyrene, vinyl naphthalene, acetoxystyrene, methyl 4-vinylbenzoate, phenoxystyrene, p-vinylphenyl ethyl eth and the like; the acrylic and substituted acrylic monomers such as methyl acrylate, ethyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha-chloroacrylate, ethyl alpha-ethoxy-acrylate, methyl alpha-acetamidoacrylate, butyl acrylate, ethyl alpha-cyanoacrylate, 2-ethylhexyl acrylate, phenyl acrylate, phenyl methacrylate, alpha-chloroacrylonitrile, ethyl methacrylate, butyl methacrylate, methyl ethacrylate, methacrylamide, N,N-dimethylacrylamide, N,N-dibenzylacrylamide, N-butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene cyanide, vinylidene bromide, 1-chloro-1-fluoroethylene, vinylidene fluoride, vinyl methyl ether, vinyl ethyl ether, vinyl propyl ethers, vinyl butyl ethers, vinyl 2- ethylhexyl ether, vinyl phenyl ether, vinyl 2-methoxyethyl ether, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, tetrafluoroethylene, chlorotrifluoroethylene, nitroethylene, vinyl furane, vinyl carbazole, vinyl acetylene, and the like.

The function of the additional monomer can be merely that of cost reduction with little or no influence on the bond strength and other properties of the adhesive or it may be incorporated to modify a specific property of the adhesive. An example of this would be the incorporation of monomers such as nitriles, esters, amides, etc. that would increase the polarity of the adhesive to make it more compatible with rubbers of higher polarity. Such modifications can easily be made by those skilled in the art and are considered to lie within the scope of this invention.

The compounded rubbers that may be bonded by the aforementioned interpolymers include natural and synthetic rubbers and their blends having a fairly high degree of unsaturation, i.e. having a minimum of about 70 mole percent polymerized conjugated diene. Examples of suitable synthetic rubbers are polybutadiene, polyisoprene, copolymers of butadiene with styrene or acrylonitrile, polychloroprene etc.

These rubbers are conventionally compounded with one or more fillers, plasticizers, curatives and antioxidants. The total amount of filler used is generally in the range of 25 to 150 parts by weight per 100 parts by weight of rubber. Fillers include the various silicas, clays, calcium carbonate; calcium silicate, titanium dioxide and carbon black. In preparing compounded stocks to be employed in the fabrication of tires, it is generally preferred that at least a portion of the filler be carbon black. The plasticizers are generally used in amounts ranging from 1.0 to 100 parts by weight of plasticizer per 100 parts by weight of rubber. The amount of plasticizer actually used will depend upon the softening effect desired. Examples of suitable plasticizers include aromatic extract oils, petroleum softeners including asphaltenes, saturated and unsaturated hydrocarbons, and nitrogen bases, coal tar products, cumarone-indene resins, and esters such as dibutyl phthalate, and tricresyl phosphate. It is to be understood that mixtures of these plasticizers can be employed. The curatives used in the curing system include a vulcanizing agent, and generally one or more vulcanization accelerators together with one or more accelerator activators. The amount of these materials used in the system generally falls in the following ranges: 0.5 to 5.0 parts by weight of the vulcanizing agent, 0.5 to 3.0 parts by weight of the accelerator, 0.5 to 20.0 parts by weight of the accelerator activator, all ranges being based on 100 parts by weight of rubber. Examples of suitable vulcanizing agents are sulfur, sulfur-liberating agents, such as thiuram disulfide, a thiuram polysulfide, or an alkylphenolsulfide, or a peroxide, such as dicumyl peroxide, or dibenzoyl peroxide. When peroxide compounds are used as vulcanizing agents, the accelerator and the accelerator activator are frequently unnecessary. Vulcanization accelerators which can be used include dithiocarbamates, thiuram sulfides, and mercaptobenzothiazoles. Examples of specific compounds which are suitable vulcanization accelerators include zinc diethyl-dithiocarbamate. N,N-di-methyl-S-tert-butylsulfenyldithiocarbamate, tetramethylthiuram disulfide, 2,2'-dibenzothiazyl disulfide, butylaldehydeaniline, mercaptobenzothiazole, N-oxydiethylene-2-benzothiazole sulfenamide, and N-cyclohexy-2-benzothiazole sulfenamide. Materials used in the compounding which function as an accelerator activator include metal oxides such as zinc oxide, magnesium oxide and litharge, which are used in conjunction with acidic materials such as fatty acid, for examples, stearic acid, oleic acid, myristic acid, and the like. Rosin acids can also be employed as the acidic material. An antioxidant is usually included in the compounding recipe in an amount ranging, for example, from 0.5 to 3.0 parts by weight per 100 parts by weight of rubber. Examples of suitable antioxidants include phenyl-$\beta$-naphthylamine, di-tert-butylhydroquinone, 2,2,4-trimethyl-6-phenyl-1,2-dihydroquinoline, a physical mixture of a complex diaryl-amineketone reaction product and N,N'-diphenyl-p-phenylene diamine, and the like. It is to be understood that it is not intended to limit the invention to any particular compounding recipe for the invention is broadly applicable to the use of silica containing conjugated diene, heterocyclic nitrogen base copolymer adhesives to bond a wide range of compounded rubber formulations to iron or steel surfaces.

The copper deposit plus the adhesives of this invention exhibit useful adhesion on ferrous (steel and iron) surfaces that have been degreased and freed of any weakly adherent oxide coatings, preferably by etching.

The adhesive is coated on the copper treated surface by any of the usual methods such as dipping, brushing, spraying, electrodisposition etc. and then dried briefly at room temperature or by the application of heat to remove solvents and/or water. The compounded rubber stock is then contacted with the adhesive surface and the whole assembly vulcanized with heat and pressure to complete the bonding process.

It is to be understood that it is not intended to limit the invention to any particular rubber compounding recipe, for the invention is broadly applicable to a wide range of compounded rubber formulations yielding high bond strengths through the copper treatment of the metal surface followed by the conjugated diene, heterocyclic nitrogen base interpolymer.

The properties of the interpolymer of the adhesive can be modified, e.g., tackiness, hardness, and oxidation stability, by adding one or more or a combination of plasticizers, fillers, curatives and antioxidants prior to the application to the metal surface.

The invention will be better understood by reference to the following illustrative examples.

EXAMPLE 1-a

Steel bead wires (JIS-SWRH-72A, d=0.96 mm) were solvent degreased, etched for about 20 seconds at 55° C. in concentrated hydrochloric acid, and rinsed in water. Then, to form coatings of copper (2.0 g/m$^2$) on their surfaces, the wires were dipped into a 10% aqueous copper nitrate (II) solution (adjusted to pH 1 with nitric acid) and rinsed in water. The wires thus treated were dipped into a 1,3-butadiene, 2-vinylpyridine, styrene polymer latex (hereunder designated as Latex No. 1, composition 70:15:15, 12 wt% resin solids) and dried at 120° C. for 45 seconds, and vulcanized in a H-Test mold at the indicated time and temperature under a pressure of 60 kg/cm$^2$ with the compound rubber formulation of Table 1. The samples were aged for 24 hours at room temperature after vulcanization, then heated to and tested at 120° C. (stretching rate=200 mm/min) to determine their bond strengths.

TABLE 1

| Compounded Rubber Formulation 1 | | |
|---|---|---|
| Natural Rubber | 100 | (parts by weight) |
| HAF Black | 50 | |
| Sulfur | 5 | |
| Pine Tar | 3 | |
| Stearic Acid | 1 | |
| Phenyl $\beta$-Naphthylamine | 1 | |
| Zinc Oxide | 8 | |
| 2-Mercapto benzothiazole | 1.5 | |
| Vulcanization Time | 30 min. | |
| Vulcanization Temperature | 135° C. | |

As controls, in place of the coated bead wires, (1) wires that were only etched, (2) wires that were only copper salt treated under the above specified conditions after etching, and (3) wires that were coated with the above polymer latex after etching were each vulcanized with the same compounded rubber formulation. The polymer latex was prepared from the polymerization recipe of Table 2, which was charged into a 1 l autoclave in nitrogen atmosphere with stirring at 50° C. for 30 hours (yield of polymerization: 98%).

TABLE 2

| (Polymerization Recipe) | | |
|---|---|---|
| 1,3-butadiene | 70 | (parts by weight) |
| Styrene | 15 | |
| 2-vinylpyridine | 15 | |
| Sodium lauryl sulfate | 10 | |
| Sodium pyrophosphate | 0.5 | |
| Dodecylmercaptan | 1 | |
| Potassium peroxide | 1.0 | |
| Water | 150 | |

All polymer latexes that were used in the following examples were prepared by the same procedure except for changes in the composition of the monomers. Table 3 shows the results of the test of bond strength.

TABLE 3

| Test No. | Bond Strength (Kg/2 cm) |
|---|---|
| Example 1-a | 70 |
| Control 1 | 5 |
| Control 2 | 12 |
| Control 3 | 10 |

EXAMPLE 1-b

Steel bead wires (JIS-SWRH-72A, d=0.96 mm) were solvent degreased, electrolytically etched for 5 seconds at room temperature in a 25% sulfuric acid bath (current density 0.5 A/cm$^2$), rinsed in water, and dipped into a 5% aqueous copper sulfate (II) solution (adjusted to pH 2 with sulfuric acid) to form layers of copper (0.2 g/m$^2$) on their surfaces. After rinsing in water, the wires were dipped into a 1,3-butadiene, 2-vinylpyridine polymer latex (composition 85:15, 12 wt% resin solids, and hereunder designated as Latex No. 2) and dried at 120° C. for 45 seconds. The coated bead wires were vulcanized in a H-Test mold at the indicated time and temperature under a pressure of 60 kg/cm$^2$ with the compounded rubber formulation of Table 4. The vulcanized samples were aged for 24 hours at room temperature, then heated to and tested at 120° C. (stretching rate 200 mm/min.) to determine their bond strengths.

TABLE 4

Compounded Rubber Formulation 2

| | | |
|---|---|---|
| Natural Rubber | 100 | (parts by weight) |
| HAF Black | 50 | |
| Sulfur | 5 | |
| Pine Tar | 3 | |
| Stearic Acid | 1 | |
| Phenyl β-Naphthylamine | 1 | |
| Zinc Oxide | 8 | |
| 2-Mercapto benzothiazole | 1.5 | |
| Cobalt Naphthenate | 2.5 | |
| Vulcanization Time | 30 min. | |
| Vulcanization Temperature | 135° C. | |

As controls, in place of the coated bead wires, (1) wires that were only etched, (2) wires that were only copper salt treated under the above specified conditions after etching, and (3) wires that were coated with the above polymer latex after etching were each vulcanized with the same compounded rubber formulation. Table 5 shows the results of the test of bond strength.

TABLE 5

| Test No. | Bond Strength (Kg/2 cm) |
|---|---|
| Example 1-b | 65 |
| Control 1 | 10 |
| Control 2 | 17 |
| Control 3 | 19 |

EXAMPLE 1-c

Steel bead wires (JIS-SWRH-72A, d=0.96 mm) were solvent degreased, etched for 20 seconds at 55° C. in concentrated hydrochloric acid, and rinsed in water. Then, to form copper coatings of 1.0 g/m$^2$ on their surfaces, the wires were electrolytically plated (current density 1 A/dm$^2$) in a plating bath (pH 9.0, 25° C.) containing 14 g/l of copper pyrophosphate, 120 g/l of potassium pyrophosphate and 10 g/l of potassium oxalate. After rinsing, the coated bead wires were dipped in the Latex No. 1 (12 wt% resin solids), and dried for 45 seconds at 120° C. The coated bead wires were vulcanized in a H-Test mold for the indicated time and temperature under a pressure of 60 kg/cm$^2$ with the compounded rubber formulation 1. The vulcanized samples were aged 24 hours at room temperature, then heated to and tested at 120° C. (stretching rate=200 mm/min.) to determine their bond strengths.

As controls, in place of the coated bead wires used above, (1) wires that were only etched, (2) wires that were only electrolytically copper plated under the conditions specified above after etching, and (3) wires that were only coated with the same polymer latex after etching were each vulcanized with the compounded rubber formulation 1.

Table 6 shows the results of the test of bond strength.

TABLE 6

| Test No. | Bond Strength (Kg/2 cm) |
|---|---|
| Example 1-c | 67 |
| Control 1 | 6 |
| Control 2 | 11 |
| Control 3 | 9 |

EXAMPLE 1-d

The procedure of Example 1-a was repeated except that the coating method of applying the latex and the type of rubber formulation were changed. The coating of the latex was done by an electro deposition method as follows:

| | |
|---|---|
| Bath solid | 12 wt. % |
| Temp | Room temperature = 25° C. |
| Cathode | Iron plate |
| Distance between electrode | 4 cm |
| Immersion depth | 10 cm |
| Voltage | 16 V |
| Time | 5 sec. |

Rubber formulation 2 of Example 1-b was used. The results of the bond strength test are shown in Table 6A.

TAble 6A

| Test No. | Bond Strength Kg/2 cm |
|---|---|
| Example | 70 |
| Control 1 | 6 |
| Control 2 | 11 |
| Control 3 | 17 |

EXAMPLE 1-e

This example shows the synergistic effect between the thin plated copper on the iron substrate and the interpolymer of the invention. Some combinations of metal surfaces other than the thin plated copper on the iron with the interpolymer do not show significantly higher bond strength than bare metal surfaces.

The following four pretreated metal substrates were dipped into Latex No. 1 from Example 1-a (12 wt% solid) and dried at 120° C. for 45 seconds:

(i) Steel bead wires (JIS-SWRH-72A, d=0.96 mm) which were solvent degreased, etched for about 20 seconds at 55° C. in concentrated hydrochloric acid and dipped into a 10% aequous copper nitrate (II) solution (adjusted to pH 1 with nitric acid) to form coatings of copper (2.0 g/m$^2$) on their surface.

(ii) Steel bead wires (JIS-SWRH-72A, d=0.96 mm) were solvent degreased and etched for about 20 seconds at 55° C. in concentrated hydrochloric acid.

(iii) Copper wires (electric wire JIS C-3102, d=1.6 mm) were solvent degreased.

(iv) Aluminum wires (JIS 1050, d=1.5 mm) were solvent degreased.

Then these latex coated wires were vulcanized in an H-Test mold at the indicated time and temperature under a pressure of 60 Kg/cm$^2$ with the compounded rubber formulation 2. The vulcanized samples were aged for 24 hours at room temperature, then heated to and tested at 120° C. (cross head speed 200 mm/min.)

In place of the latex coated wires, wires which were not coated with the latex, but only pretreated as in the preceding paragraph were vulcanized with the same compounded rubber formulation. The results were shown in Table 6B.

TABLE 6B

| | Bond Strength Kg/2 cm | |
|---|---|---|
| Wire | Latex Coated | Non-Coated |
| Steel wire + copper coating | 70 | 20 |
| Steel wire | 21 | 10 |
| Copper wire | <5 | <5 |

TABLE 7

|  | 1 | 2 | 3 | 4 | 5 | 6 | 7 | 8 | 9 | 10 | 11 |
|---|---|---|---|---|---|---|---|---|---|---|---|
| Natural Rubber | 100 | 100 | 100 | 100 | 100 | 100 | 100 |  |  |  |  |
| Polybutadiene |  |  |  |  |  |  |  | 100 | 100 |  |  |
| Isoprene Rubber |  |  |  |  |  |  |  |  |  | 100 |  |
| Butadiene-Styrene Rubber |  |  |  |  |  |  |  |  |  |  | 100 |
| MPC Black |  |  | 70 | 40 | 15 | 40 | 40 | 70 |  | 70 |  |
| HAF Black | 50 | 50 |  |  |  |  |  |  | 70 |  | 70 |
| Silica Hi-Sil 233 |  |  |  | 30 | 55 |  |  |  |  |  |  |
| Bentonite |  |  |  |  |  | 30 |  |  |  |  |  |
| Activated Clay |  |  |  |  |  |  | 30 |  |  |  |  |
| Sulfur | 5 | 5 | 5 | 3.5 | 5 | 5 | 5 | 3.5 | 1.5 | 3.5 | 1.5 |
| Pine Tar | 3 | 3 | 3 | 4 | 3 | 3 | 3 | 4 |  | 4 |  |
| Stearic Acid | 1 | 1 | 1 |  | 1 | 1 | 1 |  | 2 |  | 2 |
| Phyenyl-β-Naphthylamine | 1 | 1 | 1 | 1 | 1 | 1 | 1 | 1 |  | 1 |  |
| Cobalt Naphthenate |  | 2.5 |  | 5 |  |  |  | 5 |  |  |  |
| Zinc Oxide | 8 | 8 | 8 | 10 | 8 | 8 | 8 | 10 | 5 | 10 | 5 |
| 2-Mercaptobenzothiazole | 1.5 | 1.5 | 1.5 |  | 1.5 | 1.5 | 1.5 |  |  |  |  |
| 2-Benzothiaryl-S-2,4-Dinitrophenyl-Thioester |  |  |  | 1 |  |  |  |  |  |  |  |
| Dibenzothiazyl Disulfide/Cyclohexyl-Benzothiazyl Sulfenamide |  |  |  |  |  |  |  | 0.5/ 0.5 |  | 0.5/ 0.5 |  |
| N-Oxydiethylene Benzothiazyl-2-Sulfonamide |  |  |  |  |  |  |  |  | 1 |  | 1.3 |
| Vulcanization Temperature | 135 | 135 | 135 | 145 | 135 | 135 | 135 | 155 | 155 | 155 | 155 |
| Vulcanization Time | 30 | 30 | 60 | 90 | 60 | 60 | 60 | 30 | 30 | 30 | 30 |
| Example 2 (Latex No. 1) | 68 | 72 | 65 | 73 | 62 | 53 | 50 | 63 | 62 | 56 | 48 |
| Eample 2 (Latex No. 2) | 68 | 70 | 64 | 70 | 67 | 50 | 53 | 67 | 58 | 50 | 51 |
| Bond Strength Kg/2 cm Control 1 | 5 | 9 | 8 | 14 | 6 | 6 | 5 | 9 | 10 | 5 | 5 |
| Control 2 | 10 | 15 | 10 | 18 | 12 | 13 | 10 | 9 | 13 | 11 | 12 |
| Control 3 | 11 | 15 | 12 | 18 | 13 | 11 | 6 | 10 | 13 | 12 | 11 |
| Control 4 | 9 | 17 | 13 | 19 | 11 | 12 | 13 | 11 | 10 | 13 | 9 |

TABLE 6B-continued

| Wire | Bond Strength Kg/2 cm | |
|---|---|---|
|  | Latex Coated | Non-Coated |
| Aluminum wire | 10 | 20 |

EXAMPLE 2

Steel bead wires (JIS-SWRH-72A, d=0.96 mm) were solvent degreased, etched for 20 seconds at 55° C. in concentrated hydrochloric acid, and rinsed in water. Then, the wires were dipped in a 10% aqueous copper nitrate (II) solution (adjusted to pH 1 with nitric acid) to form layers of copper (2.0 g/m²) on their surfaces, and rinsed in water. The wires thus treated were dipped in either (1) Latex No. 1 (12 wt% resin solids) or (2) Latex No. 2 (12 wt% resin solids), and dried for 45 seconds at 120° C. The coated bead wires were vulcanized in an H-Test mold at the indicated times and temperatures under a pressure of 60 Kg/cm² with each of the eleven compounded rubber formulations specified in Table 7. The vulcanized samples were aged 24 hours at room temperature, then heated to and tested at 120° C. (stretching rate=200 mm/min.) to determine their bond strengths.

As controls, in place of the coated wires described above, (1) wires that were only etched, (2) wires that were only copper salt treated under the above specified conditions after etching, (3) wires that were coated with the above polymer Latex (No. 1) after etching, and (4) wires that were coated with the Latex No. 2 after etching, were vulcanized with each of the eleven compounded rubber formulations of Table 7.

EXAMPLE 3-a

Steel bead wires (JIS-SWRH-72A, d=0.96 mm) were solvent degreased, etched for 20 seconds at 55° C. in concentrated hydrochloric acid, and rinsed in water. They were then dipped in a 10% copper nitrate (II) solution (adjusted to pH 2 with nitric acid) to form copper coatings of 2.0 g/m² on the surface thereof, and rinsed in water. The wires thus treated were dipped in the polymer latexes (see Table 8) having different compositions and 12 wt% of resin solids, and dried for 45 seconds at 120° C. The coated bead wires were vulcanized in an H-Test mold at the indicated times and temperatures under a pressure of 60 Kg/cm² with the compounded rubber formulation 2. The samples vulcanized were aged for 24 hours at room temperature, then heated to and tested at 120° C. (stretching rate=200 mm/min.) to determine their bond strengths.

As controls, in place of the coated bead wires, wires that were only coated with each of the latexes (Table 8) after etching (no copper salt treatment) were vulcanized with the same compounded rubber formulation.

TABLE 8

| LATEX NO. | | 4 | 5 | 6 | 3 | 2 | 7 | 8 | 9 | 10 | 11 |
|---|---|---|---|---|---|---|---|---|---|---|---|
| Composition wt. % | 1,3-butadiene | 100 | 99 | 95 | 90 | 85 | 80 | 75 | 70 | 65 | 60 |
|  | 2-vinylpyridine | 0 | 1 | 5 | 10 | 15 | 20 | 25 | 30 | 35 | 40 |
| Bond Strength Kg/2 cm | Example 3-a | 18 | 60 | 63 | 75 | 72 | 74 | 57 | 50 | 45 | 30 |
|  | Control | 13 | 18 | 20 | 21 | 23 | 20 | 22 | 19 | 21 | 20 |

EXAMPLE 3-b

The procedure of Example 3-a was repeated except that the composition of the polymer latex was changed as indicated in Table 9.

The same table also shows the results of the test of bond strength.

TABLE 9

| LATEX NO. | | 12 | 13 | 14 | 15 | 16 | 17 | 18 | 19 |
|---|---|---|---|---|---|---|---|---|---|
| Composition wt. % | 1,3-butadiene | 99 | 98 | 94 | 84 | 79 | 74 | 64 | 54 |
| | Styrene | 1 | 1 | 1 | 1 | 1 | 1 | 1 | 1 |
| | 2-vinylpyridine | 0 | 1 | 5 | 15 | 20 | 25 | 35 | 45 |
| Bond Strength Kg/2 cm | Example 3-b | 16 | 57 | 62 | 70 | 68 | 65 | 50 | 33 |
| | Control | 15 | 18 | 17 | 22 | 20 | 18 | 20 | 18 |

EXAMPLE 4

The procedure of Example 3-a was followed except that the composition of the polymer latex was changed as indicated in Table 10.

The results of the test of bond strength is also shown in the table.

TABLE 10

| LATEX NO. | | 13 | 2 | 15 | 1 | 20 | 21 | 22 |
|---|---|---|---|---|---|---|---|---|
| Composition wt. % | 1,3-butadiene | 98 | 85 | 84 | 70 | 60 | 50 | 40 |
| | Styrene | 1 | 0 | 1 | 15 | 25 | 35 | 45 |
| | 2-vinylpyridine | 1 | 15 | 15 | 15 | 15 | 15 | 15 |
| Bond Strength Kg/2 cm | Example 4 | 59 | 70 | 68 | 68 | 55 | 45 | 33 |
| | Control | 19 | 25 | 23 | 21 | 16 | 17 | 19 |

EXAMPLE 5

The same procedure as in Example 3-a was repeated except that the composition was changed as indicated in Table 11.

The table also shows the results of the test of bond strength.

TABLE 11

| | LATEX NO. | 23 | 24 | 25 | 26 | 27 |
|---|---|---|---|---|---|---|
| Composition wt. % | 1,3-butadiene | | 80 | 80 | 80 | 74 |
| | Isoprene | 80 | | | | |
| | 2-vinylpyridine | 15 | | 15 | 15 | |
| | 4-vinylpyridine | | 15 | | | |
| | 2-methyl-5-vinylpyridine | | | | | 10 |
| | Styrene | 5 | 5 | | | 16 |
| | Methyl methacrylate | | | | 5 | |
| | Acrylonitrile | | | 5 | | |
| Bond Strength Kg/2 cm | Example 5 | 63 | 66 | 55 | 68 | 61 |
| | Control | 13 | 15 | 9 | 10 | 8 |

EXAMPLE 6-a

Steel bead wires (JIS-SWRH-72A, d=0.96 mm) were solvent degreased, etched for 20 seconds at 55° C. in concentrated hydrochloric acid, and rinsed in water. They were then dipped in each of the aqueous copper salt solutions (Table 12) to form layers of copper on their surfaces. After being rinsed in water, the wires were dipped in the Latex No. 2 (12 wt% resin solids) and dried for 45 seconds at 120° C. The coated bead wires were vulcanized in an H-Test mold at the indicated times and temperatures under a pressure of 60 Kg/cm$^2$ with the compounded rubber formulation 2. The vulcanized samples were aged for 24 hours at room temperature, then heated to and tested at 120° C. (stretching rate=200 mm/min.) to determine their bond strengths.

Table 12 also shows the relation between the amount of copper deposited and the bond strength.

As controls, in place of the wires coated according to the present invention, wires that were only etched and copper salt treated were vulcanized with the same compounded rubber formulation.

TABLE 12

| No. | Copper Salt Solution | Amount of copper deposited g/m$^2$ | Bond Strength Kg/2 cm Example | Bond Strength Kg/2 cm Control | Figure of the deposited copper |
|---|---|---|---|---|---|
| 1 | 5% Copper Sulfate (II) + Sulfuric Acid pH 2.0 | 0.2 | 42 | 14 | tight |
| 2 | 5% Copper Sulfate (II) + Sulfuric Acid pH 2.0 | 0.8 | 58 | 17 | tight |
| 3 | 5% Copper Sulfate (II) + Sulfuric Acid pH 2.0 | 1.1 | 43 | 15 | tight |
| 4 | 5% Copper Nitrate (II) + Nitric Acid pH 1.0 | 0.5 | 42 | 16 | loose |
| 5 | 10% Copper Nitrate (II) + Nitric Acid pH 1.0 | 6.0 | 63 | 13 | loose |
| 6 | 10% Copper Nitrate (II) + Nitric Acid pH 1.0 | 9.5 | 42 | 14 | loose |
| 7 | 5% Copper Formate (II) + Formic Acid pH 2.5 | 0.5 | 45 | 12 | tight |
| 8 | 5% Copper Formate (II) + Formic Acid pH 2.5 | 0.8 | 60 | 17 | tight |
| 9 | 5% Copper Formate (II) + Formic Acid pH 2.5 | 1.3 | 42 | 14 | tight |
| 10 | 0.1% Copper Chloride (I) + Hydrochloric Acid pH 1.0 | 0.2 | 55 | 16 | tight |
| 11 | 0.1% Copper Chloride (I) + Hydrochloric Acid pH 1.0 | 1.0 | 78 | 13 | tight |
| 12 | 0.1% Copper Chloride (I) + Hydrochloric Acid pH 1.0 | 1.5 | 50 | 16 | tight |

EXAMPLE 6-b

Steel bead wires (JIS-SWRH-72A, d=0.96 mm) were solvent degreased, etched for 20 seconds at 55° C. in concentrated hydrochloric acid, and rinsed in water. They were then subjected to electroplating in a bath (pH 9.0; 26° C.) containing 14 g/l of copper pyrophosphate, 120 g/l of potassium pyrophosphate and 10 g/l of potassium oxalate. After being rinsed in water, the wires thus treated were dipped in the Latex No. 2 (12 wt% resin solids) and dried for 45 seconds at 120° C. The coated bead wires were vulcanized in an H-Test mold at the indicated time and temperature under a pressure of 60 Kg/cm$^2$ with the compounded rubber formulation 2. The vulcanized samples were aged for 24 hours at room temperature, then heated to and tested at 120° C. (stretching rate=200 mm/min.) to determine their bond strengths.

Table 13 shows the relation between the amount of copper deposited and the bond strength.

TABLE 13

| Example Number | Amount of copper deposit g/m$^2$ | Bond Strength Kg/2 cm | Figure of the deposited copper |
|---|---|---|---|
| 1 | 0.1 | 42 | tight |
| 2 | 0.5 | 60 | tight |
| 3 | 1.0 | 65 | tight |

EXAMPLE 6-c

This example further shows the synergistic effect of the thin plated copper on the iron substrate and the interpolymer. Combinations of polymer latexes other than the interpolymer latex of the present invention and the thin plated copper on the iron substrate do not show high bond strength.

Steel bead wires (JIS-SWRH-72A, d=0.96 mm) were solvent degreased, etched for 20 seconds at 55° C. in concentrated hydrochloric acid, and rinsed in water. Then they were dipped in each of the aqueous copper salt solutions (Table 13A) to form layers of copper on their surfaces. After being rinsed in water, the wires were dipped in each of the latexes (Table 13A, 12 wt% solid) and dried for 45 seconds at 120° C. The coated bead wires were vulcanized in an H-Test mold at the indicated times and temperatures under a pressure of 60 Kg/cm$^2$ with the compounded rubber formulation 2 in Example 1-b. The vulcanized samples were aged for 24 hours at room temperature, then heated to and tested at 120° C. (cross head speed 200 mm/min.) to determine their bond strength. As controls, in place of the wires coated with latexes, wires that were only etched and copper salt treated were vulcanized with the same compounded rubber formulation. The results are shown in Table 13A.

TABLE 13A

| Number of Experiment | Copper Salt Solution | Amount of Deposited Copper g/m$^2$ | Bond Strength Kg/2 cm Coated Latex | | | |
|---|---|---|---|---|---|---|
| | | | Latex No. 1 | Natural[1] Rubber | Styrene-Buta-[2] Diene Rubber | Control |
| 1 | 5% Copper Nitrate (II) + Nitric Acid pH1 | 0.5 | 42 | 16 | 13 | 16 |
| 2 | 10% Copper Nitrate (II) + Nitric Acid pH1 | 6.0 | 63 | 10 | 9 | 13 |
| | 10% Copper Nitrate (II) + Nitric Acid pH1 | 9.5 | 42 | 5 | <5 | 14 |

[1] Dunlop
[2] JEM-2108

EXAMPLE 7-a

Steel bead wires (JIS-SWRH-72A, d=0.96 mm) were solvent degreased, etched for 20 seconds at 55° C. in concentrated hydrochloric acid, and rinse in water. They were then dipped in a 10% copper nitrate (II) solution (adjusted to pH 1 with nitric acid) to form copper coatings of 2.0 g/m$^2$. After being rinsed in water, the wires were dipped in the Latex No. 2 (12 wt% resin solids), and dried for 45 seconds at 120° C. The wires thus treated were vulcanized in an H-Test mold at the indicated time and temperature under a pressure of 60 Kg/cm$^2$ with the compounded rubber formulation 2. The vulcanized samples were aged for 24 hours at room temperature, and subjected to a thermal aging test.

In the test, the samples were aged in an air constant bath (120° C.) for the indicated times, removed, and allowed to cool. They were also heated to and tested at 120° C. (stretching rate=200 mm/min.) to determine their bond strengths.

As controls, samples were prepared by vulcanizing brassplated tire cords with the above compounded rubber. They were subjected to the same thermal aging test.

The results are shown in Table 14.

TABLE 14

| | | Aging Time (hrs.) | | | |
|---|---|---|---|---|---|
| | | 0 | 12 | 24 | 48 |
| Bond | Example 7-a | 68 | 61 | 54 | 51 |

TABLE 14-continued

| | | Aging Time (hrs.) | | | |
|---|---|---|---|---|---|
| | | 0 | 12 | 24 | 48 |
| Strength Kg/2 cm | Control | 56 | 36 | 29 | 25 |

EXAMPLE 7-b

The procedure of Example 7-a was repeated except that the following changes were made:
(1) The aqueous nitrate copper solution was replaced by a 5% aqueous copper (II) sulfate solution adjusted to pH 2 with sulfuric acid (copper deposited: 0.6 g/m$^2$);
(2) Latex No. 2 was replaced by Latex No. 1;
(3) Compounded rubber formulation 2 was replaced by the formulation indicated in Table 15.

TABLE 15

| | Parts by Weight |
|---|---|
| Natural Rubber | 60 |
| S B R | 40 |
| HAF Black | 120 |
| Sulfur | 5 |
| Stearic Acid | 1 |
| Zinc Oxide | 3 |
| Processed Oil | 20 |
| Benzothiazyl Disulfide | 1 |

The results were as indicated in Table 16.

TABLE 16

| | | Aging Time (hrs.) | | | |
|---|---|---|---|---|---|
| | | 0 | 24 | 48 | 96 |
| Bond Strength Kg/2 cm | Example 7-b | 58 | 52 | 53 | 51 |
| | Control | 55 | 30 | 28 | 25 |

As many possible embodiments may be made of this invention without departing from the scope thereof, it is to be understood that all matter herein set forth is to be interpreted as illustrative and not as unduly limiting the invention.

I claim:

1. A laminated article comprising a ferrous metal substrate having a tightly adherent deposit of copper thereon, a layer of adhesive over said copper and rubber bonded through said copper and adhesive to said ferrous metal substrate, said adhesive comprising an interpolymer containing about 50 to about 99% by weight of a conjugated diene, about 1–45% by weight of a heterocyclic nitrogen base and 0 to about 40% by weight of at least one additional copolymerizable monomer, the adhesion of the rubber to the metal having a bond strength of 40 to 90 kg/2 cm according to the H-test as defined in the above specification.

2. A laminated article according to claim 1 wherein, said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

3. A laminated article according to claim 1 wherein, said heterocyclic nitrogen base has the formula

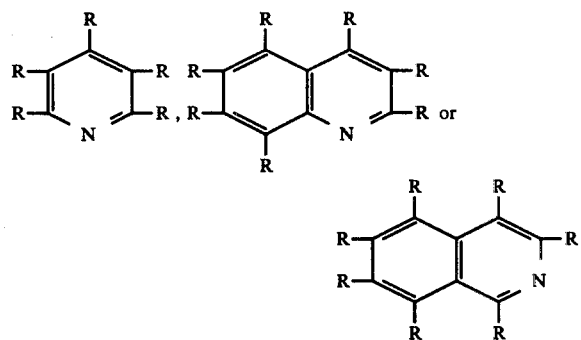

wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C<$ and the total number of carbon atoms in each R substituent being not greater than 15.

4. A laminated article according to claim 1 wherein, said heterocyclic nitrogen base is selected from the group consisting of 2-vinyl pyridine; 2-vinyl-5-ethylpyridine; 2-methyl-5-vinylpyridin 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methyl-pyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline and 3-vinyl-6-hydroxymethylisoquinoline.

5. A laminated article according to claim 1 wherein, said rubber is selected from the group consisting of natural rubber, polybutadiene, polyisoprene, copolymers of butadiene with styrene, copolymers of butadiene with acrylonitrile, and polychloroprene.

6. A laminated article according to claim 1 wherein, said interpolymer is a copolymer of butadiene and 2-vinyl pyridine.

7. A laminated article according to claim 1 wherein, said additional monomer is an organic compound containing at least one polymerizable ethylenic group.

8. A laminated article according to claim 1 wherein, said added monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

9. A laminated article according to claim 1 wherein, said interpolymer is a terpolymer of styrene, butadiene and 2-vinyl pyridine.

10. A laminated article according to claim 1 wherein, said interpolymer is a terpolymer of 2-vinyl pyridine, isoprene and styrene.

11. A laminated article according to claim 1 wherein, said interpolymer is a terpolymer of 4-vinyl pyridine, butadiene and styrene.

12. A laminated article according to claim 1 wherein, said interpolymer is a terpolymer of 2-methyl-5-vinyl pyridine, butadiene and styrene.

* * * * *